United States Patent [19]

Pohlack

[11] 4,335,935
[45] Jun. 22, 1982

[54] ARRANGEMENT FOR THE INDUCED ABSORPTION OF ELECTROMAGNETIC RADIATION

[75] Inventor: Hubert Pohlack, Jena, German Democratic Rep.

[73] Assignee: Jenoptik Jena GmbH, Jena, German Democratic Rep.

[21] Appl. No.: 143,574

[22] Filed: Apr. 25, 1980

[30] Foreign Application Priority Data

Apr. 27, 1979 [DD] German Democratic Rep. ... 212541

[51] Int. Cl.³ ................................................ G02B 5/28
[52] U.S. Cl. .................................. 350/166; 350/276 R
[58] Field of Search ................ 350/1.6, 1.7, 164, 166, 350/259, 260, 290, 276 R, 276 SL

[56] References Cited

U.S. PATENT DOCUMENTS

| 2,890,624 | 6/1959 | Widdop et al. | 350/166 |
| 3,698,928 | 10/1972 | Blome | 350/276 R |
| 4,082,413 | 4/1978 | Austin et al. | 350/290 |

FOREIGN PATENT DOCUMENTS 52-3443 1/1977 Japan .................................. 350/166

OTHER PUBLICATIONS

Lowe, A. C., "Solar Energy Absorber", IBM Technical Disclosure Bulletin, vol. 21, No. 2, Jul. 1978, p. 834.
Flordal, L. E. et al., "Vacuum Evaporated Thin Films for Solar Collectors", *Vacuum,* vol. 27, No. 4, pp. 399–402, Apr. 1977.

*Primary Examiner*—John K. Corbin
*Assistant Examiner*—Bruce Y. Arnold
*Attorney, Agent, or Firm*—Jordan and Hamburg

[57] ABSTRACT

An absorption device for electromagnetic radiation includes a plurality of layers positioned to the path of the radiation, in the following order: a transparent layer, an absorbing layer, a plurality of non-absorbing layers having alternate low and high refractive indices, and a final transparent layer.

4 Claims, 2 Drawing Figures

ARRANGEMENT FOR THE INDUCED ABSORPTION OF ELECTROMAGNETIC RADIATION

BACKGROUND OF THE INVENTION

This invention relates to an arrangement for absorption of electromagnetic radiation and the transformation of electromagnetic radiation to heat energy, kinetic electroenergy, ionizing energy and other forms of energy. The invention is particularly directed to the provision of components for determining a function, such as photoelectrical detectors, solar energy converters and resonance absorbers.

Arrangements for the absorption of electromagnetic radiation are known having material composition, surface properties and/or inner structure which make them capable of absorbing a part, as large as possible, of the radiant energy striking the apparatus. Based upon the high reflection occurring at the interfaces of the absorbing media, the yield of energy to be absorbed is rather small because, following the energy principle, the reflected part of radiation is subtracted from the radiation entering the absorbing material. Methods for the demirroring of surfaces, for instance of metals with appropriate optical surfaces, effecting an increase of the penetrating part of radiation, are known. Since the absorption of electromagnetic radiation in metals occurs in path-lengths of approximately $10^{-4}$ to $10^{-5}$ cm and in other less absorbing substances in even longer distances, the absorbing materials must have thicknesses of at least that order of magnitude in order to provide efficient absorption.

Arrangements are also known where increased absorption is obtained using very thin layers. In other words, more radiation transparent layers are provided, these layers being thinner than the above-mentioned order of magnitude. An increase of absorption in these arrangements is obtained by the addition of non-absorbing appropriately dimensioned, extended and/or layered media, however having relatively low efficiency due to the relatively high remaining transparency, as required by theoretical principles.

OBJECT OF THE INVENTION

It is therefore the object of this invention to provide an apparatus for substantially completely absorbing electromagnetic radiation.

SUMMARY OF THE INVENTION

The invention is directed to the prevention of reflection and transmission of an extremely thin layer to such an extent that almost total absorption is induced within the absorbing layer.

In accordance with the invention, an arrangement is provided having two transparent materials $n_1$ and $n_{p+1}$ and an absorbing layer for the absorption of electromagnetic radiation within a spectral interval including a selectable wavelength. Non-absorbing or slightly absorbing single layers, capable of interference, consisting of alternate low-refracting layers of a refractive index $n_n$ and high-refracting layers of a refractive index $n_h$, are arranged in the path direction of the incident radiation following the absorbing layer. The layers capable of interference are dimensioned so that the equation $n_1^2 A - 2n_1 B + C = 0$ is fulfilled. Here A, B and C are mathematical combinations of the real refractive index n, the coefficient of absorption k and the optical layer thickness of the absorbing layer d of the absorbing layer as well as of the wavelength $\lambda$ of the electromagnetic radiation which is absorbed and in whose spectral surroundings the almost total absorption is induced.

In this case $$A = 1 - (\sin n\chi)^2 + (\sin hk\chi)^2$$

$$B = \tfrac{1}{2}(k \sin 2n\chi + n \sin h2k\chi)$$

$$C = (n^2 + k^2)[(\sin n\chi)^2 + (\sin hk\chi)^2]$$

In the above equation $\chi = (2/\lambda) \cdot d$

The number of layers capable of interference, consisting of alternate low-diffracting single layers and high-diffracting single layers, having respectively the diffraction-indices $n_n$ and $n_h$ and their relations of diffraction as well as the diffraction index $n_{p+1}$ of the final material are chosen in such a manner that the factor for an even number $$\left( \frac{n_n \text{ 1. layer} \cdot n_n \text{ 3. layer} \ldots}{n_h \text{ 2. layer} \cdot n_h \text{ 4. layer} \ldots} \right)^2 \cdot n_{p+1}$$

is small compared to 1 and that the factor for an uneven number $$\left( \frac{n_n \text{ 1. layer} \cdot n_n \cdot \text{3. layer} \ldots}{n_h \text{ 2. layer} \cdot n_h \text{ 4. layer} \ldots} \right)^2 \cdot \frac{1}{n_p + 1}$$

is small compared to 1.

The total absorption within the extremely thin absorbing layer is more complete as this factor is decreased.

It is advantageous according to the invention to design the layers capable of interference so that the equation $n_1^2 \overline{A} - 2n_1 \overline{B} + \overline{C} = 0$ is satisfied. Here $\overline{A}, \overline{B}, \overline{C}$ are derived from A, B, C by replacing the angle- and hyperbole-functions by their arguments, a practice resulting in a sufficiently good approximation due to the extremely small thickness d of the absorbing layer. Here:

$$\overline{A} = 1 - (n\chi)^2 + (k\chi)^2$$

$$\overline{B} = 2nk\chi$$

$$\overline{C} = (n^2 + k^2)[(n\chi)^2 + (k\chi)^2]$$

The invention lowers the reflected intensity at the interfaces of optical media when electromagnetic radiation spreads. The effect of lowered reflection is caused by the multiple interference of the partial rays reflected at the layerfaces.

BRIEF FIGURE DESCRIPTION

The invention will now be disclosed in greater detail with reference to the accompanying drawings, wherein FIG. 1 is a schematic view of the arrangement according to the invention depicting the relative positions of the various layers; and FIG. 2 is a graph showing the correlation of refractive index n, coefficient of absorption k and the layer thickness d of the absorbing layer, as well as the factor $\chi$.

DETAILED DESCRIPTION

Figure 1:
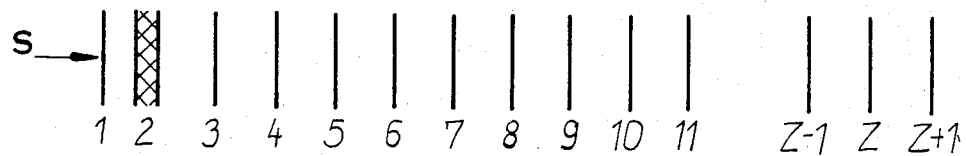

As shown in FIG. 1, a transparent medium 1 having a refractive index $n_1$ is arranged in front of an absorbing layer 2 in the direction toward the incident beam S. In this figure, showing the absorption device schematically, the lines denote the relative position of the respective layers of the device. A transparent medium $Z+1$ having a refractive index $n_{p+1}$, is spaced from the layer Z on the side away from the medium 1. An extremely thin absorbing, preferably metallic layer 2 and a plurality of non-absorbing layers 3, 4, 5, 6, ... $Z-1$, Z are positioned, in that order, between the layer Z and medium $Z+1$. The layers 3 through Z are capable of interference and have alternatingly low and high refractive indices and optical layer thicknesses of a quarter of a wavelength to be absorbed in each case. The absorbing layer 2 is in front of the interference layers, looking toward the incident rays S.

Figure 2:
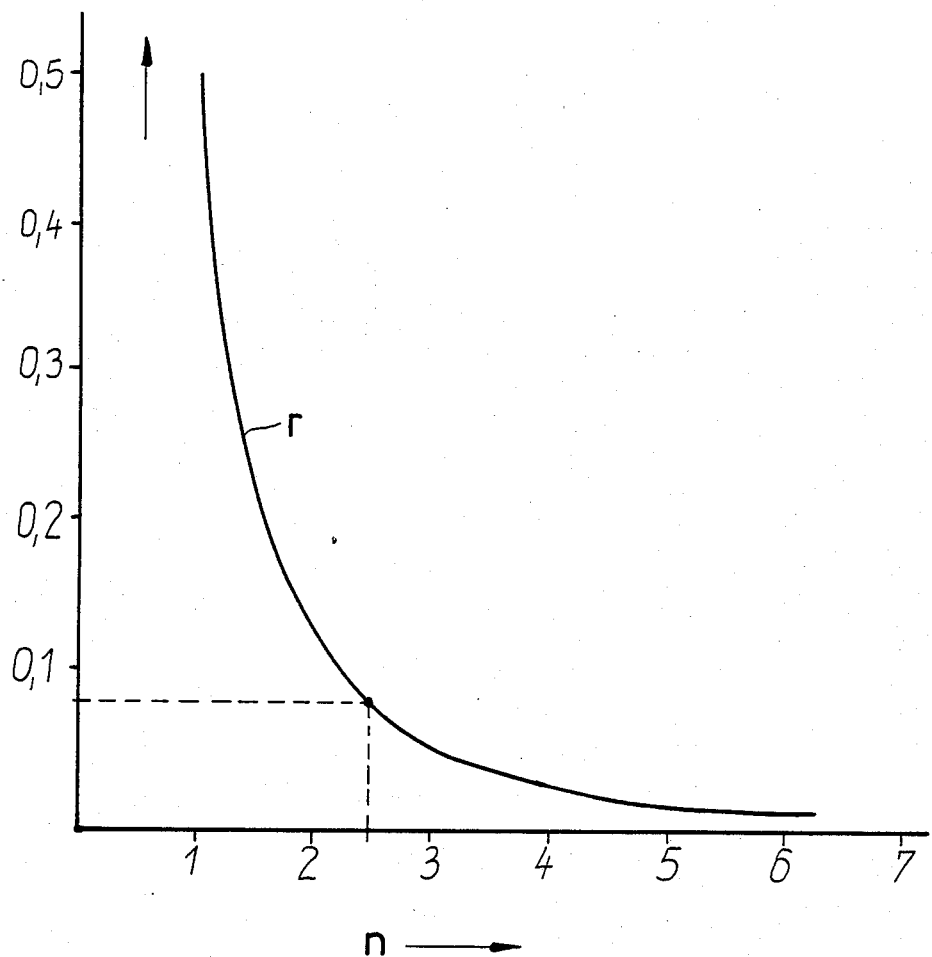

FIG. 2 graphically shows the relationship between the real refractive index n, the absorbing layer and the factor $\chi = (2\pi/\lambda) \cdot d$ which is a function of the layer-thickness of the absorbing layer and the wavelength $\lambda$. The values are taken from the approximate equation $$n_1^2 \overline{A} - 2n_1 \overline{B} + \overline{C} = 0 \qquad (I)$$

The abscissa of FIG. 2 shows the real refractive index n of the absorbing layer. The value $r = 0$ was employed as a parameter for the introduced value $r = n^2 - k^2$. Each pair of values for n and r is linked to one value factor $\chi = (2\pi/\lambda) \cdot d$ and thereby with the layer thickness d while the wavelength $\lambda$ is maintained constant.

The calculations were based upon the approximate equation (I) which was solved by using the factor:

$$\chi = \frac{2n_1 n (n^2 - r)^{\frac{1}{2}} \pm [n_1^2 r (1 - r)]^{\frac{1}{2}}}{(2n^2 - r)^2 - n_1^2 r}$$

The refractive index $n_1$ of medium 1 is set at 1.0, the wavelength equals 800 nm and $\lambda = 0.08$. In other words the thickness d of this absorbing layer is set at $d \approx 10$ nm. The graph in FIG. 2 results when the refractive index n and the absorption coefficient k $n = k - 2.5$, since r is assumed to equal 0.

First Calculated Example

In order to approximate the total absorption for the absorbing layer 2 the next following four interference layers 3 to 6 are employed the first and the third of these interference layers having the refractive indices $n_n = 1.34$. The second and the fourth of these layers have a refractive index $= 2.4$. The final layer $Z+1$ has a refractive index $= 1.5$. When one calculates the degree of transmission $\tau$ and the degree of reflection $\rho$ by the use of formulae generally known for thin layers, the values:

$\tau = 0.127 = 12.7\%$ $\rho = 0.005 = 0.5\%$ are obtained, in other words, a coefficient of absorption $\alpha = 1 - \tau - \rho = 0.868 = 86.8\%$. When one correspondingly calculates the degree of transmission $\tau$, the degree of reflection $\rho$ and the degree of absorption of the absorbing layer 2 with the same values of the constants n, k and d directly, using only the final layer $Z+1$ with a refractive index of 1.5, in other words leaving out the absorbing layers 3 to 6, the results are $\tau = 0.488 = 48.8\%$ $\rho = 0.184 = 18.4\%$ $\alpha = 0.328 = 32.8\%$.

The use of the arrangement corresponding to FIG. 1 and the use of the four interference layers 3 to 6 thus results in nearly a threefold increase of absorption.

Second Calculated Example

The values for the wavelength $\lambda$, the quantity $\chi$ as well as for the refractive indices of the interference layers and for the final layer are the same as in the first example. For the approximation of the total absorption of the absorbing layer 2, six interference layers 3 to 9 are provided following the absorbing layer 2, in the path direction of the incident radiation S. The results in this case are $\tau = 0.043 = 4.3\%$ $\rho = 0.001 = 0.1\%$ The degree of absorption $\alpha$ in this arrangement is 95.6%.

Third Calculated Example

This example shares all values with the two preceding examples, but eight interference layers 3 to 11 are provided. The calculated results here are:

$\tau = 0.014 = 1.4\%$ $\rho = 0.000 = 0.0\%$

The degree of absorption $\alpha$ in this arrangement is $0.906 = 96.8\%$

Fourth Calculated Example

It will be interesting to see what value of absorption can be obtained when the numbers for n and k diverge from the calculated optimum values, this is worth while because, in contradistinction to the aforementioned examples where the optical constants n and k of the absorbing layer were fixed by the equation (I) within a limited interval of values deriving from a chosen wavelength to be absorbed and from a definite thickness d of the absorbing layer, it might frequently occur that no appropriate absorbing substances are available for the numbers n and k.

In this calculated example an arrangement is chosen which conforms to the second calculated example insofar as the number of interfering single layers is concerned, but where the indices for $n = k = 2.5$ which are derived from the equation (I) are replaced by $n = 2$ and $k = 3$. In this case one finds the following values for the degree of transmission $\tau$, the degree of reflection $\rho$ and the degree of absorption $\alpha$.

$\tau = 0.043 = 4.3\%$ $\rho = 0.044 = 4.4\%$ $\alpha = 0.913 = 91.3\%$

This result shows that, despite the deviation of the constants of the absorbing layer from their optimum conditions, the absorption shows almost a threefold increase as compared to an arrangement without interfering layers.

What is claimed is:

1. In an arrangement for the absorption of electromagnetic radiation of a spectral interval including a selectable wavelength λ, comprised of two radiation-permeable materials and one absorbing layer that is very thin as compared to the wavelength, the improvement wherein non-absorbing or only slightly absorbing λ/4 interference layers of low refractive index single layers and high refractive index single layers of refractive indicies $n_n$ and $n_h$ respectively are alternately arranged in the direction of the incident radiation following said absorbing layer, and that said absorbing layer has a thickness d and an absorption coefficient k such that the relationship $$n_1^2 A - 2n_1 B + C = 0$$

is satisfied,
where $$A = 1 - (\sin n\chi)^2 + (\sin hk\chi)^2$$

$$B = \tfrac{1}{2}(k \sin 2n\chi + n \sin h2k\chi)$$

$$C = (n^2 + k^2)[(\sin n\chi)^2 + \sin hk\chi)^2]$$

and where $\chi = (2\pi/\lambda)\cdot d$, n is the refractive index of said absorbing layer, and $n_1$ is the refractive index of the medium positioned in front of said absorbing layer.

2. An arrangement according to claim 1, wherein the number, p, of layers capable of interference, comprised of alternately low refractive index single layers of refractive index $n_n$ and high refractive index single layers of refractive index $n_h$ and the relations of their refractive indices as well as the refraction index $n_{p+1}$ of the final layer are chosen such that the product $$\left( \frac{n_n \text{ 1. layer} \cdot n_n \text{ 3. layer} \ldots}{n_h \text{ 2. layer} \cdot n_h \text{ 4. layer} \ldots} \right)^2 \cdot n_{p+1},$$

when p is an even number, is small compared to 1 and that the product $$\left( \frac{n_n \text{ 1. layer} \cdot n_n \text{ 3. layer} \ldots}{n_h \text{ 2. layer} \cdot n_h \text{ 4. layer} \ldots} \right)^2 \cdot \frac{1}{n_{p+1}},$$

when p is an odd number, is small compared to 1.

3. An arrangement according to claim 1 wherein the layers capable of interference are dimensioned such that the equation $$n_1^2 \overline{A} - 2n_1 \overline{B} + \overline{C} = 0$$

is satisfied when $$\overline{A} = 1 - (n\chi)^2 + (k\chi)^2$$

$$\overline{B} = 2nk\chi$$

$$\overline{C} = (n^2 + k^2)[(n\chi)^2 + (k\chi)^2].$$

4. An arrangement, for the absorption of electromagnetic radiation of a given wavelength within the spectral content of a source of radiation, comprising a plurality of layers positioned to receive radiation from said source in the following order:
   (a) a first transparent layer
   (b) an absorbing layer
   (c) a plurality of substantially non-absorbing λ/4 layers having alternate low and high refractive indices, and
   (d) a final transparent layer, the thickness of the absorbing layers satisfying the relationship:

$$n_1^2 A - 2n_1 B + C = 0$$

where:

$$A = 1 - (\sin n\chi)^2 + \sin hk\chi)^2$$

$$B = \tfrac{1}{2}(k \sin 2n)(\div n \sin h2k\chi)$$

$$C = (n^2 + k^2)[(\sin n\chi)^2 + (\sin hk\chi)^2]$$

and $\chi = 2/\lambda d$
and where λ is the given wavelength, $n_1$ is the refractive index of the first transparent layer, d is the thickness of the absorbing layer, k is the coefficient of absorption of the absorbing layer, and n is the real refractive index of the absorbing layer.

* * * * *